US012586445B2

(12) United States Patent
Rundle et al.

(10) Patent No.: US 12,586,445 B2
(45) Date of Patent: Mar. 24, 2026

(54) SYSTEM AND METHOD FOR CONTINGENCY WAGERING

(71) Applicant: DABBLE SPORTS PTY LTD, Darwin (AU)

(72) Inventors: Thomas Rundle, East Melbourne (AU); Scott Hutchens, East Melbourne (AU); Dave Robin, East Melbourne (AU); Jonathon Robin, East Melbourne (AU); Andrew Smith, East Melbourne (AU)

(73) Assignee: DABBLE SPORTS PTY LTD, Darwin (AU)

( * ) Notice: Subject to any disclaimer, the term of this patent is extended or adjusted under 35 U.S.C. 154(b) by 254 days.

(21) Appl. No.: 18/579,584

(22) PCT Filed: Oct. 28, 2021

(86) PCT No.: PCT/AU2021/051261
§ 371 (c)(1),
(2) Date: Jan. 16, 2024

(87) PCT Pub. No.: WO2023/283670
PCT Pub. Date: Jan. 19, 2023

(65) Prior Publication Data
US 2024/0321059 A1 Sep. 26, 2024

(30) Foreign Application Priority Data
Jul. 16, 2021 (AU) ................................ 2021902195

(51) Int. Cl.
*G07F 17/32* (2006.01)
*G06Q 50/00* (2012.01)
*G06Q 50/34* (2012.01)

(52) U.S. Cl.
CPC ......... *G07F 17/3288* (2013.01); *G06Q 50/01* (2013.01); *G06Q 50/34* (2013.01); *G07F 17/323* (2013.01); *G07F 17/3272* (2013.01)

(58) Field of Classification Search
None
See application file for complete search history.

(56) References Cited

U.S. PATENT DOCUMENTS

2012/0214575 A1* 8/2012 Amaitis .............. G07F 17/3269 463/25
2014/0274311 A1* 9/2014 Aronowitz ............ G07F 17/326 463/25

(Continued)

OTHER PUBLICATIONS

"Gambling and Match Fixing in Sporting Events", Queensland Law Handbook Online, Mar. 16, 2018, as per Wayback Machine, 2 pp., https://web.archive.org/web/20180316153843/https://queenslandlawhandbook.org.au/the-queensland-law-handbook/health-and-wellbeing/sport/gambling-and-match-fixing-in-sporting-events/, Dec. 17, 2021.

(Continued)

*Primary Examiner* — Jason T Yen
(74) *Attorney, Agent, or Firm* — Kaplan Breyer Schwarz, LLP

(57) ABSTRACT

Embodiments of the present disclosure provide a system and method for contingency wagering. The system provides a first user interface (UI) to create a plurality of user accounts and a second UI to establish connection between the plurality of user accounts. Further, the system provides display of a plurality of contingency wagers and enables each user to select at least one contingency wager of the plurality of contingency wagers. The system sends a notification to each user account of a set of users accounts of the plurality of user accounts, based on selection of the at least one contingency wager by at least one user account of the plurality of user (Continued)

accounts other than the set of user accounts. The notification includes a plurality of links, where a first link of the plurality of links corresponds to a copy operation on the at least one contingency wager.

20 Claims, 11 Drawing Sheets

(56) References Cited

U.S. PATENT DOCUMENTS

| | | | | |
|---|---|---|---|---|
| 2017/0358173 | A1* | 12/2017 | Mccafferty | G07F 17/3239 |
| 2019/0080427 | A1 | 3/2019 | Lippert | |
| 2019/0244485 | A1 | 8/2019 | Jones | |
| 2022/0101694 | A1* | 3/2022 | Huke | G07F 17/3274 |

OTHER PUBLICATIONS

"What is a hedge in sports betting?", Apr. 21, 2021, as per Wayback Machine, 5 pp., https://web/archive.org/web/20210421102154/https://www.rotowire.com/betting/faq/question.php?q=hedge-sports-betting-d11aedce, Dec. 14, 2021.

"What Is Hedging in Sports Betting? When To Hedge Your Bets", The Action Network, Jan. 20, 2021, as per Wayback Machine, https://web.archive.org/web/20210120143015/https://www.actionnetwork.com/education/hedging, Dec. 14, 2021.

Authorized Officer: Christopher Hodgson, International Search Report and Written Opinion issued in PCT Application No. PCT/AU2021/051261, Jan. 6, 2022, 11 pp.

J. Buchdahl, "Fixed Odds Sport Betting", dated 2003, High Stakes Publishing, London, ISBN 1-84344-0199, Viewable via Google Books, p. 53.

* cited by examiner

SYSTEM AND METHOD FOR CONTINGENCY WAGERING

TECHNICAL FIELD

The presently disclosed subject matter generally relates to the field of wagering. Particularly, the present subject matter relates to a system and method for contingency wagering.

BACKGROUND

Wagering on sporting events such as horse races, cricket matches, soccer matches and the like is a large but still growing industry all over the world. Wagering involves a bettor making a bet that a particular person, team, or animal will score or win in a particular event. With recent advancements in information technology and networking, wagering is now often undertaken online where bettors can virtually make their bet with ease. One type of bet is called a contingency bet. This is a betting approach that involves making supporting bets to offset potential losses on main bets. Betting (i.e., wagering) apps and websites that facilitate placing contingency bets are run by bookmakers that require a user to open an account, fund that account, select the contingency bet they would like to make and then make the bet with the bookmaker to potentially win money that would then deposit into the user's account.

Users often share the details of bets they have placed with their friends and other social connections via third party platforms including social networking or messaging systems, by uploading a screenshot of their bet or using a share mechanism provided by the wagering system. Friends and other socials connections can then copy the betting details and place their own bet using their own account with either the same or a different bookmaker. Also, users often share that they have placed the bet, comment on the bet itself and react to the bet on the social networking or messaging system. However, it soon becomes inconvenient for bettors to use multiple platforms to share their bets and place the bets at the same time. Considerable memory space and processing power are required from a device to execute such multi-platform processes within the device.

It is an object of the present invention to overcome or ameliorate the above discussed disadvantages of the prior art, or at least offer a useful alternative.

In light of above discussion, there exists a need for improved techniques for an efficient wagering system.

SUMMARY

To overcome the above-mentioned limitations and problems, the present disclosure provides a system and method for contingency wagering.

An embodiment of present disclosure provides a system for contingency wagering. The system may comprise a social networking module that provides a first user interface (UI) to create a plurality of user accounts, wherein each user account of the plurality of user accounts is associated with a respective user of a plurality of users. The social networking module further provides a second UI to enable each user of the plurality of users to establish connection between the plurality of user accounts. The system may also comprise a display module that provides display of a plurality of contingency wagers, a bet feed of each user account of the plurality of user accounts, and a profile feed of each user account of the plurality of user accounts. The system may also comprise a contingency wager module that enables each user of the plurality of users to select at least one contingency wager of the plurality of contingency wagers provided by the display module. The system may also comprise a notification module that sends a notification to each user account of a set of users accounts of the plurality of user accounts. The notification is sent to each user account of the set of user accounts based on selection of the at least one contingency wager by at least one user account of the plurality of user accounts other than the set of user accounts. The notification includes a plurality of links. A first link of the plurality of links corresponds to a copy operation on the at least one contingency wager.

In some cases, a second link of the plurality of links may correspond to selection of the profile feed of the at least one user account other than the set of user accounts, and third link of the plurality of links corresponds to selection of the bet feed of the at least one user account other than the set of user accounts.

In some cases, the display module may further provide, on the bet feed of the at least one user other than the set of users, the at least one contingency wager selected by the at least one user other than the set of users.

In some case, the social networking module may further provide, to each user account of the plurality of user accounts, a third UI to add comments on the at least one contingency wager on the bet feed of the at least one user other than the set of users.

In some cases, the display module may further determine a total number of the comments on the bet feed of the at least one user other than the set of users and aggregate the comments in the bet feed based on the total number of comments being greater than a threshold value.

In some cases, the at least one user account other than the set of user accounts may correspond to an originator of the at least one contingency wager selected from the plurality of contingency wagers.

In some cases, the contingency wagering module may further execute the copy operation on the at least one contingency wager based on a user input corresponding to the selection of the first link.

In some cases, the contingency wagering module may further execute a paste operation on the at least one contingency wager after the execution of the copy operation. The execution of the paste operation may correspond to selection of the at least one contingency wager by at least one of the set of user accounts connected to the originator of the at least one contingency wager.

In some cases, the notification module may further send a notification to the originator of the contingency wager when the copy operation is executed on the at least one contingency wager In some cases, the display module may further determine a relevancy score corresponding to each user account of the plurality of user accounts. The relevancy score is determined based on a set of parameters. The set of parameters includes at least: past contingency wagers selected from each corresponding user account of the plurality of user accounts, a degree of relationship between each corresponding user account and other users of the plurality of user accounts, quality of comments posted on the at least one contingency wager, a number of followers of each corresponding user, and a plurality of extraordinary elements associated with the at least one contingency wager.

In some cases, the plurality of extraordinary elements corresponds to at least one of: a value of odds for the at least one contingency wager greater than a threshold value, or a number of legs associated with the at least one contingency wager greater than a threshold value.

In some cases, the display module may further provide display of the plurality of contingency wagers based on the relevancy score.

In some cases, the display module may further concurrently display the bet feed, the profile feed, one or more comments, an input text area to add comments, and a reaction button.

In some cases, the contingency wagering module may further receive user one or more user inputs to add a synopsis for the at least one contingency wager.

In some cases, the social networking module may further provide a search field to search profiles of the plurality of users, receive a user input to select a desired profile from among search results, and receive a user input to send a follow request to the desired profile.

In some cases, each user account of the plurality of user account may be one of a public account or a private account.

Another embodiment of the present disclosure provides a method for contingency wagering. The method comprising creating a plurality of user accounts, wherein each user account of the plurality of user accounts is associated with a respective user of a plurality of users; establishing connection between the plurality of user accounts; displaying each of: a plurality of contingency wagers, a bet feed of each user account of the plurality of user accounts, and a profile feed of each user account of the plurality of user accounts; selecting at least one contingency wager of the plurality of contingency wagers being displayed; and sending a notification to each user account of a set of users accounts of the plurality of user accounts, wherein the notification is sent to each of the set of user accounts based on selection of the at least one contingency wager by at least one user account of the plurality of user accounts other than the set of user accounts, the notification includes a plurality of links, and a first link of the plurality of links corresponds to a copy operation on the at least one contingency wager.

In some cases, a second link of the plurality of links corresponds to selection of the profile feed of the at least one user account other than the set of user accounts, and a third link of the plurality of links corresponds to selection of the bet feed of the at least one user account other than the set of user accounts.

In some cases, the method further comprising concurrently displaying the bet feed, the profile feed, one or more comments, an input text area to add comments, and a reaction button.

A yet another embodiment of the present disclosure provides a first user device for contingency wagering. The device may comprise a memory configured to store computer-executable instructions; and a processor communicatively coupled to the memory, wherein the processor is configured to execute the computer-executable instructions to: control a display screen to: display a first user interface (UI) to receive a plurality of user inputs to create a user account of a first user; and display a second UI to receive one or more inputs from the first user to establish a connection with a user account of a second user, wherein the user account of the second user operates on a second user device; select at least one contingency wager of a plurality of contingency wagers based on one or more user inputs from the first user; and sending a notification to the user account of the second user, wherein the notification includes a link to execute a copy operation on the at least one contingency wager selected by the first user.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
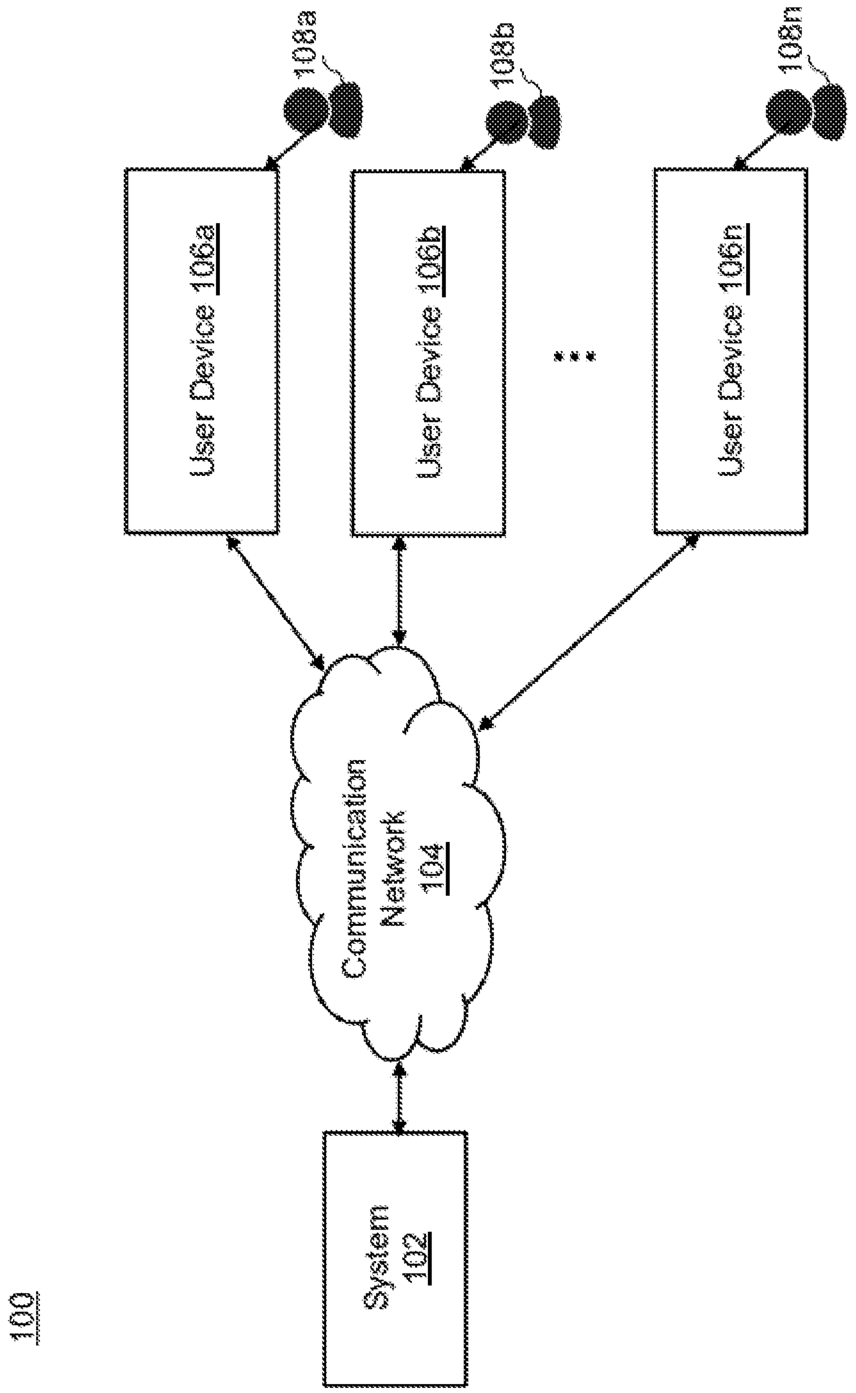
FIG. 1 is a schematic diagram illustrating an exemplary environment for a contingency wagering system, where various embodiments of the present disclosure may function.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices or units. A device or unit may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device.

Indeed, an executable code of a device or module could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

In accordance with the exemplary embodiments, the disclosed computer programs or modules can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

FIG. 1 is a schematic diagram illustrating an exemplary environment 100 for a system 102, where various embodiments of the present disclosure may function. As shown, the environment includes, the system 102, a communication network 104, and a plurality of user devices 106*a*, 106*b*, . . . , 106*n* (also referred as a plurality of users 106*a*-106*n*) of each respective user of a plurality of users 108*a*, 108*b*, . . . , 108*n* (also referred as a plurality of users 108*a*-108*n*).

The system 102 may comprise suitable logic, circuitry, interfaces that may be configured to provide a platform for execution of contingency wagering. In particular, the system 102 may be configured to provide an integrated platform that enables each of the plurality of users 108*a*-108*n* to perform contingency wagering as well as social interaction with other users. Accordingly, the plurality of users 108*a*-108*n* may become able to interact with each other while placing bets on one or more events without switching to other platforms. The system 102 may include a processor (not shown), non-transitory storage medium (not shown), an I/O (inpuUoutput) device (not shown), a network interface (not shown), and the like. Detailed description of structural aspects of the system 102 is described further with reference to FIG. 2. The system 120 may include one computing device or be distributed among a plurality of computing devices. These computing devices are optionally connected via a communications system such as a local area network. In some embodiments, the system 102 may correspond to a cloud computing system.

In some embodiments, the system 102 may be configured to provide an application interface to each of the plurality of user devices 106*a*-106*n*. In other words, the system 102 may provide an application of the contingency wagering to each of the plurality of user devices 106*a*-106*n*, where the plurality of users 108*a*-108*n* can interact with each other while placing contingency wagers (hereinafter, also referred as "bets").

The communication network 104 may be configured to transmit and receive signals. The communication network 104 may include various configurations and protocols including short range communication protocols such as the Internet, World Wide Web, intranets, virtual private networks, wide area networks, local networks, private networks using communication protocols proprietary to one or more companies, Ethernet, Wi-Fi and HTTP, and various combinations of the foregoing. Such communication may be facilitated by any device capable of transmitting data to and from other computing devices, such as modems and wireless interfaces.

Each user device of the plurality of user devices 106*a*-106*n* may be a personal or mobile computing device, such as a smartphone, a tablet, a notebook computer, or a desktop computer. In some embodiments, each user device of the plurality of user devices 106*a*-106*n* may execute a specific application that uses an application programming interface (API) to communicate with the system 102 through the communication network 104. Further, the plurality of communication devices 106*a*-106*n* may also be configured to communicate with each other through the system 102 and the communication network 104. To that end, each user device may be configured to transmit information to the system 102 through the communication network 104. Further, the system 102 forwards (transmits) the information to other user device(s) through the communication network 104. Accordingly, the system 102 operate as an intermediary between the plurality of user devices 106*a*-106*n*.

In operation, the system 102 may provide a plurality of user interfaces (UI) to the plurality of user devices 106*a*-106*n* in order to perform the contingency wagering. In particular, the system 102 may provide a UI (hereinafter, also referred as a first UI) to create a plurality of user accounts for contingency wagering. Each user account of the plurality of user accounts is associated with a respective user of the plurality of users 108*a*-108*n*. To that end, each user of the plurality of users 108*a*-108*n* may enter information using the first UI. For instance, each user may provide identification information (such as name, age, date of birth, mobile number, email identification (ID), and the like), account information (such as bank account details), password, and the like in order to create an account for the contingency wagering. In some embodiments, the system 102 may also provide another UI (hereinafter, also referred as a second UI) to enable the plurality of users 108*a*-108*n* to establish connection between the plurality of user accounts. More specifically, the system 102 may provide a social networking platform to each of the plurality of users 108*a*-108*n* to follow each other by inputting one or more user inputs using the second UI. For example, a user 108*a* follows a user 108*b* by using the second UI. To that end, the user 108*a* may send a follow request to the user 108*b* via the social networking platform provided by the system 102.

The system 102 may provide display of a plurality of contingency wagers on each user device of the plurality of user devices 106*a*-106*n*. Also, the system 102 may provide display of profile feed and bet feed of each user account of the plurality of user accounts.

In some embodiments, the system 102 may enable each user of the plurality of users 108*a*-108*n* to select at least one contingency wager of the plurality of contingency wagers being displayed on a corresponding user device of each user.

Some embodiments are further based on realization that users of conventional contingency wagering systems switch between different platforms or systems to interact with each other in order to discuss their bets or to bet in group. For example, a user takes screenshot of his/her bet and shares the screenshot with other users by using social networking websites or applications. The user who shared the bet may be considered as an originator of the bet. The other users then place the same bet by using the conventional contingency wagering systems. To that end, the other users locate the same bet within the same conventional contingency wagering system or on a different conventional contingency wagering system to place the same bet. In case the other users want to communicate with the originator of the bet, they need to switch to a social networking website or application. Due to back and forth switching between different systems and/or platforms, it becomes inconvenient for the users to use the conventional contingency wagering systems. Also, such cumbersome procedures of the contingency wagering and interacting with people require each user of the conventional contingency wagering systems to have different platforms on their respective user device. Consequently, the conventional methods of contingency wagering consume additional memory space and processing in each of the user devices. To overcome the aforementioned problems, the disclosed system 102 provides an integrated platform that provides contingency wagering as well as social networking within a single platform.

Referring to FIG. 1, when the at least one contingency wager is selected by at least one user (for example, a user 108*a*) of the plurality of users 108*a*-108*n* by using a respective user device (for example, the user device 108*a*), the system 102 may send notification to each of a set of users (for example, users 108*b*-108*n*) of the plurality of users 108*a*-108*n* other than the user 108*a*. To that end, the notification may be sent to a set of user accounts of the plurality of user accounts other a user account of the user 108*a* as the user 108 is the originator of the at least one contingency wager. Each user account of the set of user accounts may be associated with a respective user of the set of users 108*b*-108*n*. In other words, each user device of the plurality of user devices 106*b*-106*b* corresponding to each of the set of users 108*b*-108*n* may receive notification from the system 102, where each user device may be configured to operate a respective user account of the plurality of user accounts. The notification may include a plurality of links. A first link of the plurality of links may correspond to a copy operation on the at least one contingency wager placed by the at least one user 108*a*. A second link of the plurality of links may correspond to selection of the profile feed of the at least one user account of the at least one user 108*a*. A third link of the plurality of links may correspond to selection of the bet feed of the at least one user account of the at least one user 108*a*.

In some embodiments, one or more of the set of users 108*b*-108*n* may select at least one of the plurality of links. In response, the one or more users of the set of users 108*b*-108*n* may be able to see the at least one contingency wager placed by the at least one user 108*a*. The one or more users of the set of users may also be able to copy the at least one contingency wager and place the same contingency wager from his/her user account. Accordingly, the at least one contingency wager is placed automatically based on selection of a link received in the notification from the system 102. Therefore, a user using the system 102 may not need to switch between different platforms to perform contingency wagering.

In some embodiments, the system 102 may provide one or more UIs to enable the plurality of users 108*a*-108*n* to react to contingency wagers placed by one or more of the plurality of users 108*a*-108*n*. This improves interaction between the plurality of users 108*a*-108*n* while performing contingency wagering. Accordingly, the system 102 facilitates an efficient integrated platform that enables an interactive contingency wagering.

Figure 2:
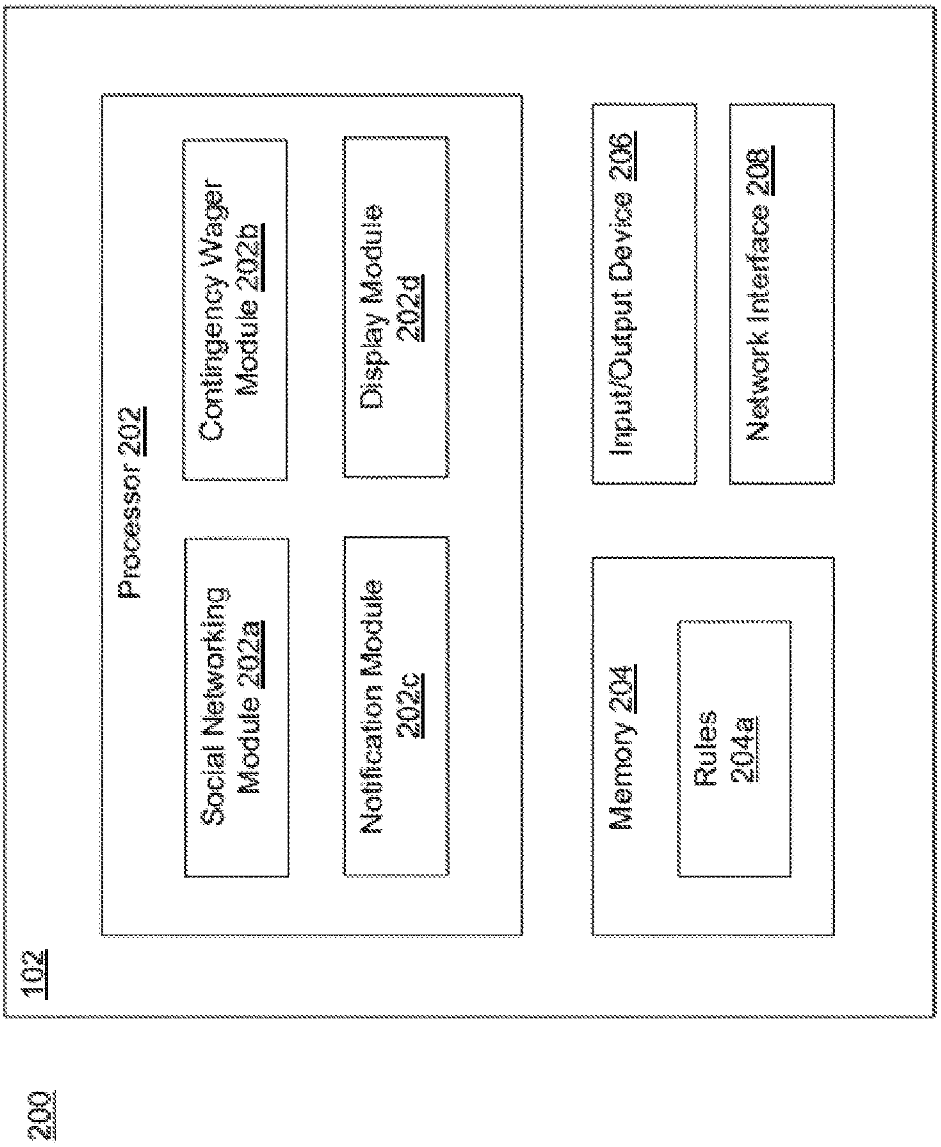
FIG. 2 is a block diagram illustrating various system elements of an exemplary contingency wagering system, in accordance with some embodiments of the present disclosure.

FIG. 2 is a block diagram that illustrates various system elements of an exemplary system for contingency wagering, in accordance with some embodiments of the present disclosure. FIG. 2 is explained in conjunction with elements of FIG. 1. With reference to FIG. 2, the block diagram 200 of the system 102 may include a processor 202, a memory 204, an Input/Output (I/O) device 206, and a network interface 208.

The processor 212 may be communicatively coupled to the memory 204, the I/O device 206, and the network interface 208.

The processor 202 may comprise suitable logic, circuitry, interfaces that may be configured to execute a set of instructions stored in the memory 204. The processor 202 may be implemented based on a number of processor technologies known in the art Examples of the processor 202 may be a Central Processing Unit (CPU), an x86-based processor, an x64-based processor, a Reduced Instruction Set Computing (RISC) processor an Application-Specific Integrated Circuit (ASIC), a Complex Instruction Set Computing (CISC) processor, a field-programmable gate array-based processor, a specialized digital signal processor (DSP), or other processors, and the like. For example, the CPU and the DSP may work to simultaneously control the contingency wagering as well as interaction among users placing the contingency wagers.

In some embodiments, the processor 202 may be configured to implement a plurality of modules including a social networking module 202, a contingency wagering module 202*b*, a notification module 202*c*, and a display module 202*d*. The memory 204 may store a plurality of computer-readable instructions corresponding to each of the plurality of modules.

The social networking module 202*a* may be configured to provide a plurality of UIs to enable each of the plurality of users 108*a*-108*n* to create a respective user account and interact with each other. In other words, the social networking module 102 implement a social networking service for the plurality of users 108*a*-108*n*. To that end, the plurality of computer-readable instructions corresponding to the social networking module 202*a* may be executed by the processor 202. As a result, each user device of the plurality of user devices 106*a*-106*n* may be provided with the plurality of UIs to create a user account, follow other users, and interact with the other users. For instance, the social networking module 202*a* provide the first UI to create the plurality of user accounts and the second UI to establish connection between the plurality of users, as described above with reference to FIG. 1. Further, the social networking module 202*a* also provide a third UI, to each user account of the plurality of user accounts, a third UI to add comments on the at least one contingency wager on the bet feed of the at least one user 108 other than the set of users 108*b*-108*n*.

The contingency wagering module 202*b* may be configured to provide a plurality of UIs to enable each user of the plurality of users 108*a*-108*n* to place contingency wagers. In particular, the contingency wagering module 202*b* may be configured to provide a wagering platform for a plurality of ongoing events such as cricket matches, soccer matches, boxing matches, horse race, and the like. To that end, the plurality of computer-readable instructions corresponding to the contingency wagering module 202*b* may be executed by the processor 202. As a result, each user device of a corresponding user device of the plurality of user devices 106*a*-106*n* may be provided with the plurality of UIs to select at least one contingency wager of a plurality of contingency wagers. In some embodiments, the contingency wagering module 202*b* may be configured to provide one or more UIs to add synopsis to the at one selected contingency wager. By adding the synopsis, a user can specify his/her reason of placing a specific wager.

The notification module 202*c* may be configured to provide notification to each user device of the plurality of plurality of user devices 106*a*-106*n* based on one or more triggering conditions. For instance, the one or more triggering conditions may be selection of at least one contingency wager by at least one of the plurality of users 108*a*-108*n* having a respective user account. In some case, the notification module 202*c* may be configured to send notification to each of the plurality of user accounts operating on a corresponding user device of the plurality of user devices 106*a*-106*n*, when a user sends a follow request to another user.

In some cases, the triggering conditions may correspond to messages, reactions, follow requests, comments, and the like received from one user of the plurality of users 108*a*-108*n* for another user of the plurality of users 108*a*-108*n*. In such scenarios, the notification module 202*c* may relay specific information including the messages, reactions, follow requests, comments, and the like to intended user of the plurality of users 108*a*-108*n* by sending the specific information to a corresponding user account added on a device of the plurality of user devices 106*a*-106*n* over a communication network 104.

In some embodiments, the notifications may be sent via different technologies such as off-platform direct communications, email, SMS, push notification or other channel that one of their connections has placed a bet.

The display module 202*d* may be configured to generate display of a plurality of contingency wagers for a plurality of events. To that end, the processor 202 may execute a plurality of computer-readable instructions corresponding to the display module 202*d*. Further, the display module 202*d* may also generate a profile feed and/or a bet feed of each user of the plurality of users. The profile feed may indicate record of activities of a user account of a respective user of the plurality of users 108*a*-108*n*. In particular, the profile feed may be associated with images, profile information, follower lists, posts, and the like. The bet feed may indicate one or more contingency wagers placed by a user of the plurality of users 108*a*-108*n*. For instance, the display module 202*d* provides, on the bet feed of the at least one user (the user 108*a*) other than the set of users (the set of users 108*b*-108*n*), the at least one contingency wager selected by the at least one user (the user 108) other than the set of users (the set of users 108*b*-108*n*). In some embodiments, the display module 202*d* may be configured to concurrently provide display of the profile feed and the bet feed within a single display screen.

The memory 204 may comprise suitable logic, circuitry, and interfaces that may be configured to store a plurality of instructions executable by the processor 202. The memory 204 may be configured to store data of operating systems and associated applications. In some embodiments, the memory 204 may be configured to store information of each user account of the plurality of user accounts. In some further embodiments, the memory 204 may be configured to store information of contingency wagers currently being placed by each of the plurality of users 108*a*-108*n* and information of past contingency wagers placed by each user of the plurality of users 108*a*-108*n*. Examples of implementation of the memory 204 may include, but are not limited to, Random Access Memory (RAM), Read Only Memory (ROM), Electrically Erasable Programmable Read-Only Memory (EEPROM), Hard Disk Drive (HOD), a Solid-State Drive (SSD), a CPU cache, or a Secure Digital (SD) card 1.

In some embodiments, the memory 202 may be configured to store a set of rules 204*a* which may correspond to a set of conditions for analysis of data and execution of one or more operations by the processor 202. The rules 204*a* may be associated with contingency wagering. In one example embodiment, the rules 204*a* may indicate that a user is not allowed to place contingency wager on both opposite teams of an event. In another example embodiment, the rules 204*a* may indicate that if a number of comments for a post on the profile feed and/or the bet feed of each user is greater than a threshold value, such comments are required to be aggregated in order to avoid over communication. In some embodiments, the triggering conditions may also be stored as the rules 204*a* in the memory 204. Further. the processor 202 may be configured to analyze data based on the rules 204*a* before executing the one or more operations. In other words, the processor 202 and the memory, in combination, may form a rule engine.

The I/O device 206 may comprise suitable logic, circuitry, interfaces that may be configured to transmit and receive information such as a plurality of user inputs, notifications, and the like.

The network interface 208 may comprise suitable logic, circuitry, and interfaces that may be configured to facilitate communication between the system 102 and each of the plurality of user devices 106*a*-106*n* a communication network (e.g., the communication network 104). The network interface 208 may be implemented by use of various known technologies to support wired or wireless communication of the system 102 with the each of the plurality of user devices 106*a*-106*n*. The network interface 208 may include, but is not limited to, an antenna, a radio frequency (RF) transceiver, one or more amplifiers, a tuner, one or more oscillators, a digital signal or a local buffer circuitry. In some embodiments, the network interface 208 may communicate via wireless communication with other networks, such as the Internet, an Intranet or a wireless network, such as a cellular telephone network, a wireless local area network (LAN), and a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TOMA), voice over Internet Protocol (VOIP), light fidelity (Li-Fi), Worldwide Interoperability for Microwave Access (Wi-MAX), a protocol for email, instant messaging, and a Short Message Service (SMS).

Figure 3A:
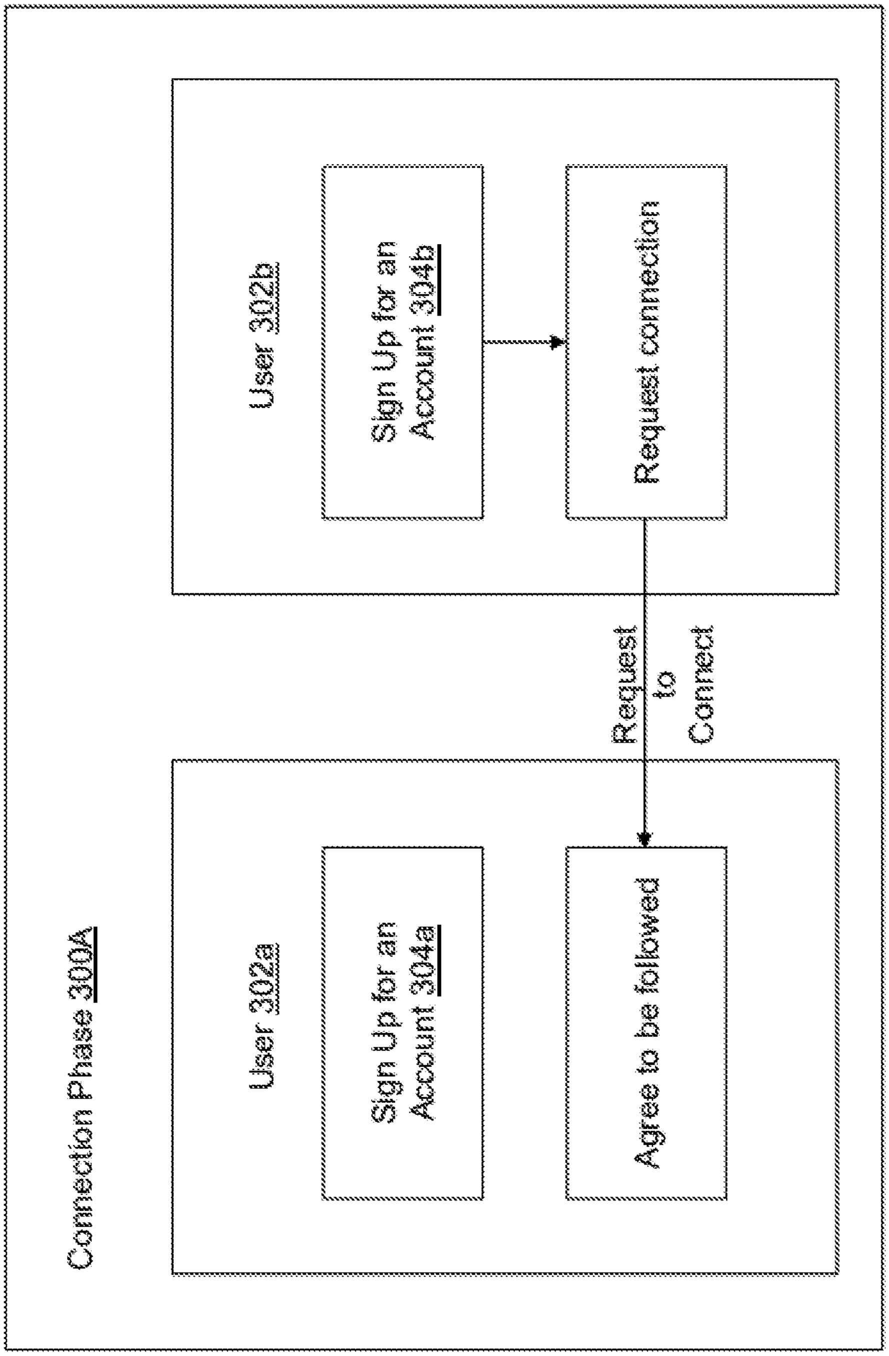
FIG. 3A illustrates a connection phase in a contingency wagering process, in accordance with some embodiments of the present disclosure.

FIG. 3 illustrates a connection phase 300A in a contingency wagering process, in accordance with some embodiments of the present disclosure.

Some embodiments are based on realization that a social networking platform enables users to interact online with each other regardless of their location. To that end, each user is required to create a user account by providing information such as name, date of birth, email ID, phone number, password, and the like. Further, each user is also required to follow other users on the social networking platform by sending follow requests to them. Accordingly, the users can create an online community or a group by adding each other on the social networking platform. The users can share messages with each other, post reactions and/or comments on profile feeds, share media, and the like. In such embodiments, a contingency wagering process may be executed by the system 102 by connecting the plurality of users on a social networking platform. To that end, the disclosed system 102 may provide an application for the contingency wagering including a social networking platform for each of the plurality of users 108*a*-108*n* of a respective user device of the plurality of user devices 106*a*-106*n*. The plurality of users 108*a*-108*n* may be able to interact with each other by signing up to their respective user account from their respective user device of the plurality of user devices 106*a*-106*n*. Such a process for establishing connection between the plurality of user accounts corresponds to the connection phase 300A in the contingency wagering process.

For example, in the connection phase 300A, a user 302*a* may sign up for an account 304*a*. In other words, the user 302*a* wants to join the social networking platform provided by the system 102. To that end, the user 302*a* may provide information required to join the social networking platform. Similarly, other users (e.g., a user 302*b*) join the social networking platform. In some cases, a user account may correspond to a public profile. In some other cases, a user account may correspond to a private profile.

Further, the users may add each other on the social networking platform in order to interact with each other. To that end, a user is required to send a connection request to another user. For example, the user 302*b* sends a connection request to the user 302*a*.

In case the user account 304*a* is a public account, the user 302*b* is not required to wait for acceptance of the connection request from the user 302*a*. In another case where the user account 304*a* is a private account, the user 302*b* waits for acceptance of the connection request from the user 302*a*. Once the user 302*a* accepts the connection request from user account 302*b*, the user 302*a* agrees to be followed by the user 302*b*. Further, the user 302*a* may also follow back the user account 302*b* by sending a connection request to the user account 304*b*.

Accordingly, the user 302*a* and the user 302*b* may become able to follow each other on the social networking platform, where the user 302*a* and the user 302*b* can view the profile feed and the bet feed of each other. Also, the user 302*a* and the user 302*b* can comment or react on profile feed and/or the bet feed of each other. Details of user interaction during placement of the contingency wager is described further with reference to FIG. 3B.

Figure 3B:
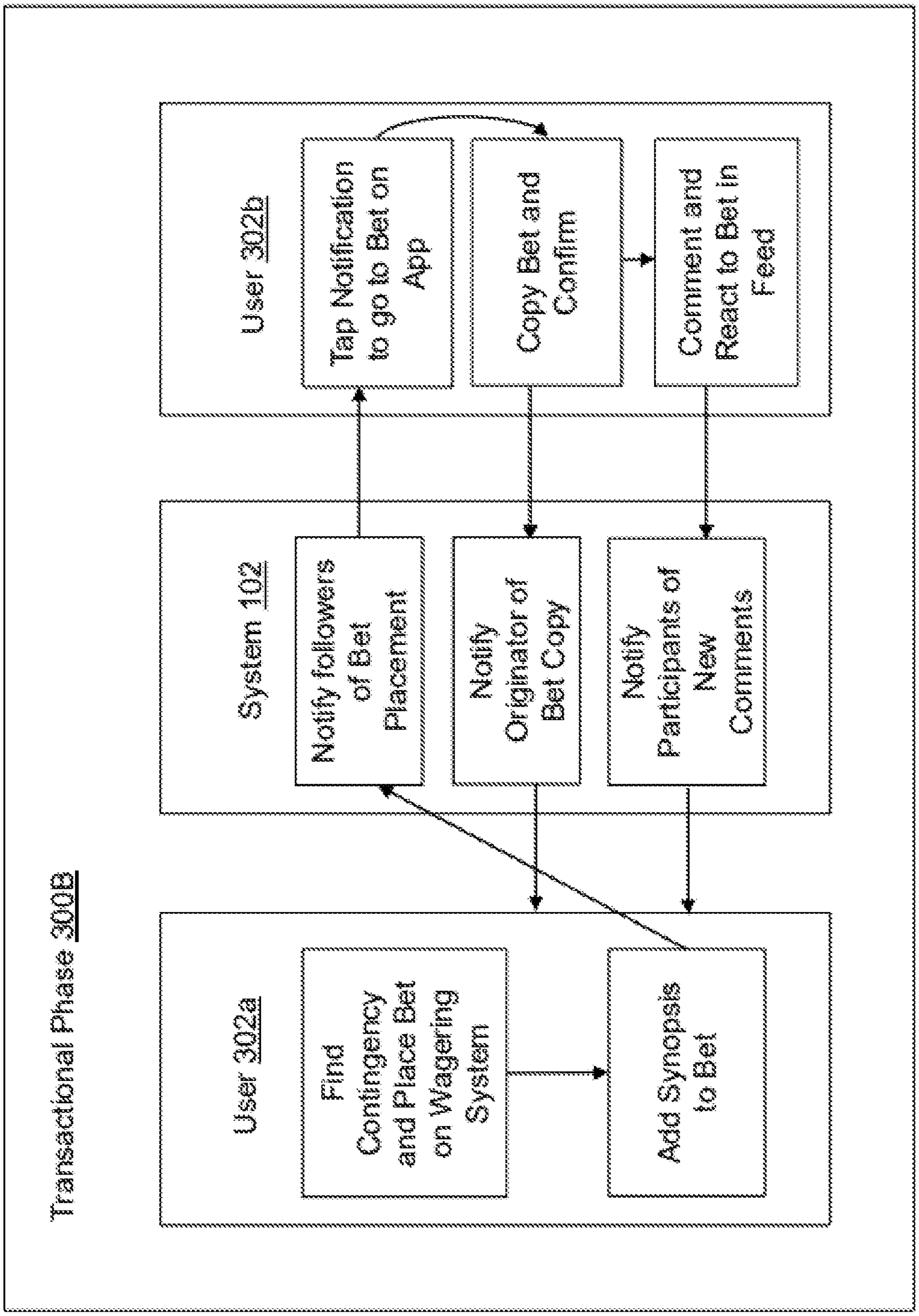
FIG. 3B illustrates a transaction phase in the contingency wagering process, in accordance with some embodiments of the present disclosure.

FIG. 3B illustrates a transaction phase 300B in the contingency wagering process, in accordance with some embodiments of the present disclosure.

After completion of the connection phase 300A in the contingency wagering process, the transaction phase 300B is executed. The transaction phase 300B includes interaction between the user 302*a*, the system 102, and the user 302*b* after the connection establishment between the user 302*a* and the user 302*b*. In an exemplary scenario, the user 302*a* may sign up into the respective account (i.e., account 304*a*) from his/her user device (e.g., any user device from the plurality of user devices 106*a*-106*n*). Further, the user 302*a* may find contingency for an event (e.g., a sports match) and place a bet on the event from his/her account 304*a*. Since the user 302*a* is a first user for placing the bet, the user 302*a* placing the bet may also be called as "an originator" of the bet. Some embodiments are based on realization that adding reason for the bet may help followers (e.g., the user 302*b*) of the user 302*a* to decide whether they should copy the bet placed by user 302*a*. To that end, the contingency module 202*b* of system 102 may provide a UI to also add synopsis to the bet, where the synopsis may indicate a reason for placing the bet. For instance, the user 302*a* may specify the that "team X has been winning all past matches from one year".

In response to the placement of the bet by the user 302*a*, system 102 may notify the followers of the bet placement by the user 302*a*. To that end, the notification module 202*c* of the processor 202 of the system 102 may generate notifications and send the notifications to the followers of the user 302*a*.

The notification may include one or more links such as a link for opening the application of the contingency wagering for placing the same bet placed by the user 302*a*. When the application is opened, a bet feed of the user 302*a* is displayed on the user device of user 302*b*. Also, the bet feed includes a link to copy the bet feed placed by the user 302*a* from his/her account 302*a*.

The user 302*b* copies the bet by clicking on the link for copying the bet. In particular, a paste operation is performed when a user input corresponding to selection of the copy link is received. In some embodiments, another link is displayed to confirm the copy operation on the bet. Subsequently, the user 302$a$ confirms the copy operation by selecting the other link and hence the same bet is placed by the user 302$b$.

Some embodiments are based on realization that the originator of the bet (i.e., the user 302$a$) may feel confident about his/her bet when he/she gets to know that a follower (i.e., user 302$b$) of the originator of the bet has copied the bet. This also increases interaction among the users on during the contingency wagering process. Accordingly, in some embodiments, the system 102 may notify the user 302$a$ (i.e., the originator of the bet) regarding the copy operation performed by the user 302$b$ on the bet.

In some embodiments, user accounts of the followers (i.e., account 304$b$ of the user 302$b$) may be provided with UIs on their user devices to comment and react to the bet placed by the originator (i.e., user 302$a$) of the bet. In particular, the user 302$b$ may add emoticons to react to the bet on the bet feed of the user 302$a$. In order to comment on the bet, the user 302$b$ may add text in the bet feed of the user 302$a$. To that end, the user 302$b$ may open the bet feed or profile feed of the user 302$a$ from his/her account 302$b$ on the corresponding user device.

The system 102 notifies the user 302$a$ regarding participants of new comments. In particular, the system 102 may further forwards the comments and/or reaction to the user 302$a$ by sending notification to the user 302$a$. To that end, the notification module 202$c$ of the processor 202 of the system 102 may send notification to the user device of the user 302$a$. Accordingly, the user 302$a$ is notified about the reaction and/or comments provided by the user 302$b$ (i.e., the follower of the user 302$a$).

Some embodiments are based on realization that The user 302$a$ can have many followers including the user 302$b$. In case all followers comment on the bet feed of the user 302$a$, it may become difficult to display all comments on the display screen. Such situation is called as overcommunication. To overcome this, the display module 202$d$ of the processor 202 of the system 102 may be configured to determine a total number of comments on the bet feed of the at least one user other than the set of users. Further, the display module 202$d$ may aggregate the comments in the bet feed based on the total number of comments being greater than a threshold value. Accordingly, the effect of overcommunication due to the number of comments greater than the threshold value is overcome.

Figure 4A:
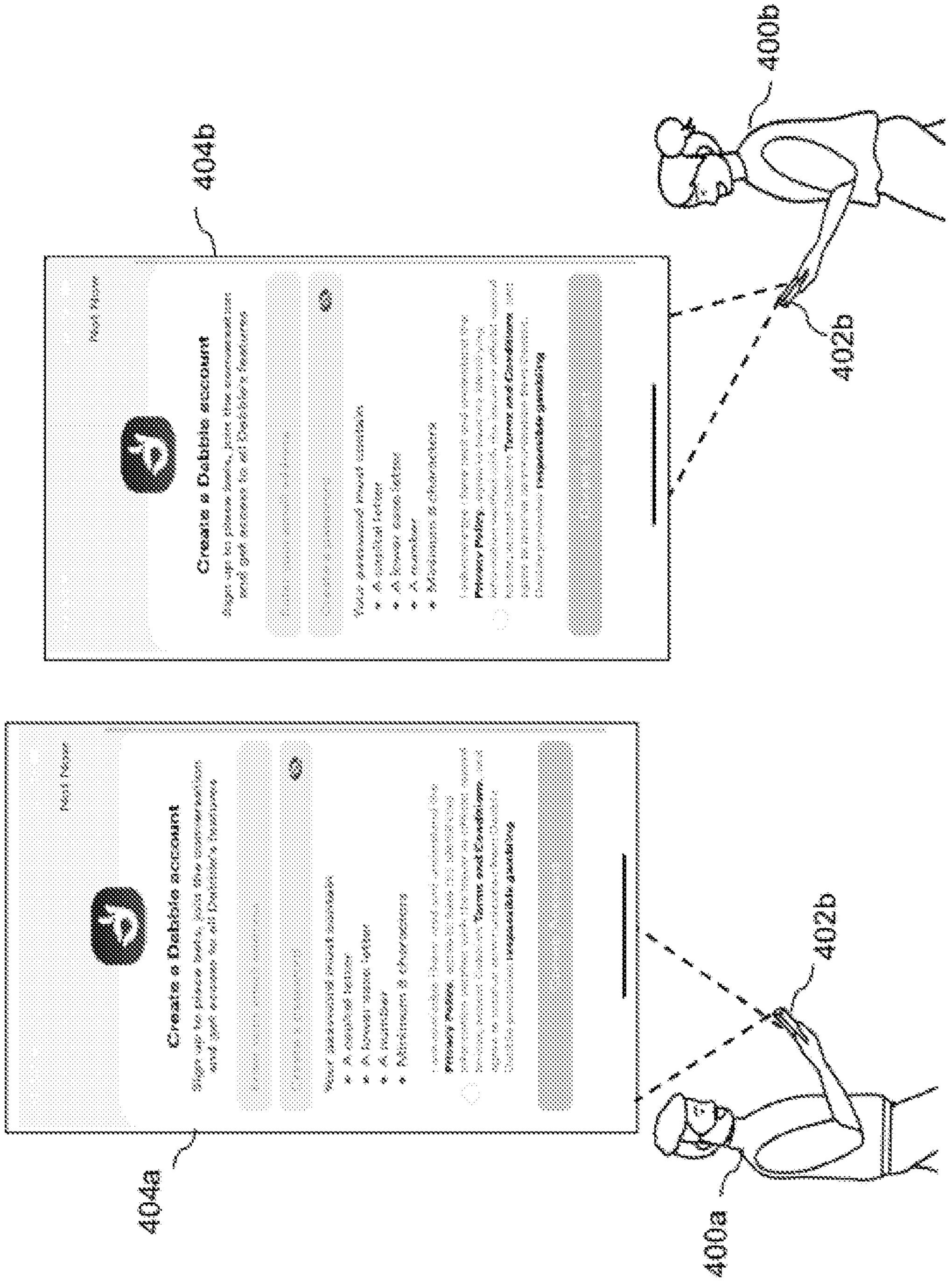
FIGS. 4A and 4B, in combination, illustrate pictorial representation of the connection phase in the contingency wagering process, in accordance with some embodiments of the present disclosure.
Figure 4B:
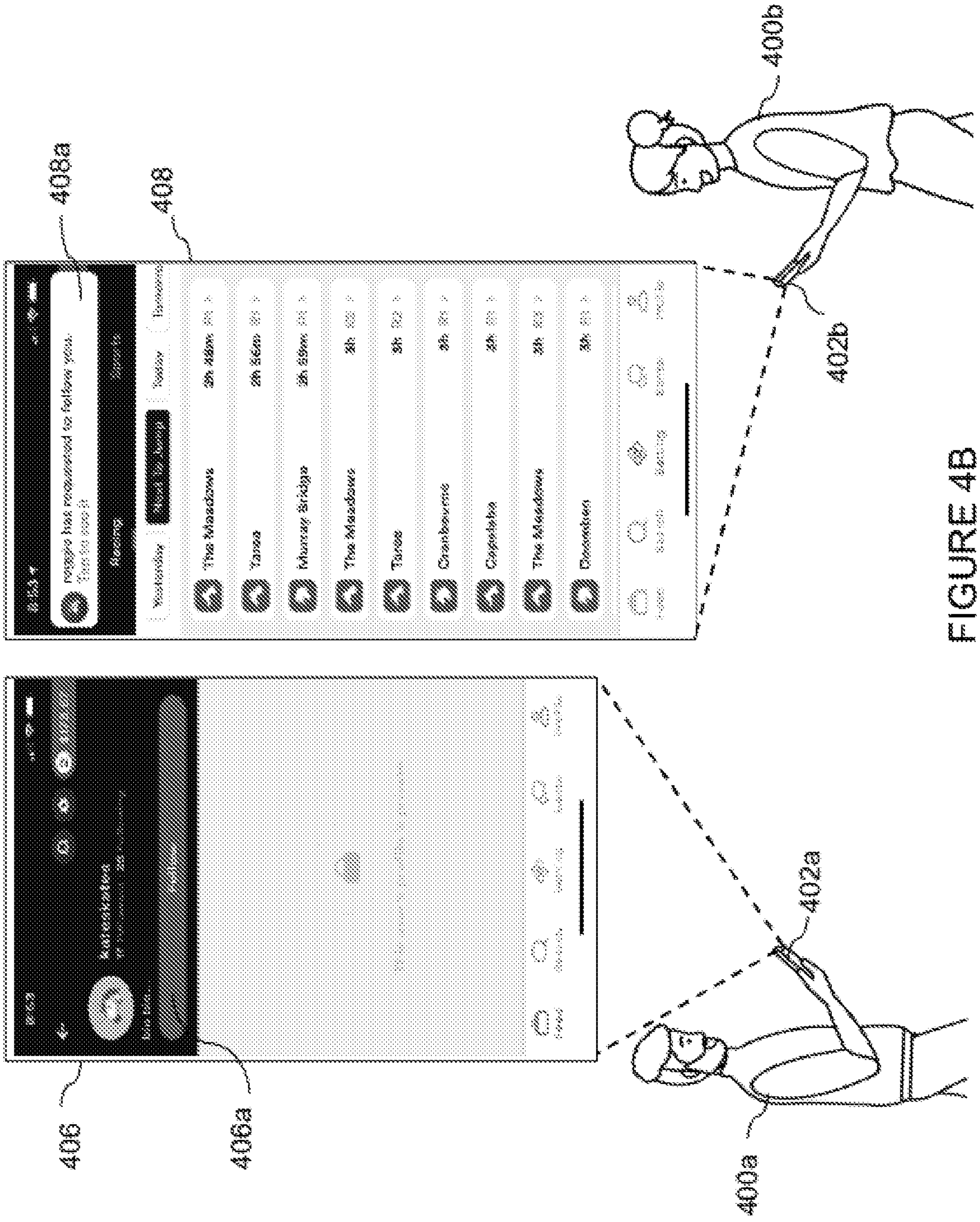

FIGS. 4A and 4B, in combination, illustrate pictorial representation of the connection phase 300A in the contingency wagering process, in accordance with some embodiments of the present disclosure.

In particular, FIG. 4A illustrate a step of creating user accounts. In FIG. 4A, there is shown a first user 400$a$ and a second user 400$b$. There is further shown a user device 402$a$ of first user 400$a$ and a user device 402$b$ of the second user 400$b$. Each of the first user 400$a$ and the second user 400$b$ sign up for a respective user account by opening an application of the disclosed contingency wagering process from their user devices: the user device 402$a$ and the user device 402$b$, respectively. Further, an application interface is displayed on each of the user device 402$a$ and the user device 402$b$. For instance, the application interface 404$a$ is displayed on the user device 402$a$ and the application interface 404$b$ is displayed on the user device 402$b$. Each user is required to create a corresponding user account by providing information such as name, date of birth, email ID, phone number, password, and the like. As a result, a corresponding user account is created for the first user 400$a$ and the second user 400$b$.

FIG. 4B illustrate a process of adding other users on the application of the contingency wagering process.

To that end, the first user 400$a$ can send a follow request to the second user 400$b$. In particular, the first user 400$a$ may search for the second user 400$b$ by entering a username of the first user 400$a$ in a search field provided on an application interface 406. As a result, a name of the second user 400$b$ (e.g., "Kateskates" as shown in the application interface 406) is displayed on the user device 402$a$ of the first user 400$a$. Further, the first user 400$a$ provides a user input to select a desired profile from among search results. To that end, a touch-button (e.g., follow 406$a$) is displayed on the application interface 406 to follow the second user 400$b$. As the first user 400$a$, taps on the touch-button "follow 406$a$", a follow request is sent to the second user 400$b$.

Consequently, a notification 408$a$ is received at a user account of the second user 400$b$ running on the user device 402$b$ of the second user 400$b$. For example, the notification 408$a$ may indicate "Reggie has requested to follow you. . . . Tap to see it". The second user 400$b$ further taps on the notification to accept the follow request. Accordingly, the second user 400$b$ agrees to be followed by the first user 400$a$.

Figure 4C:
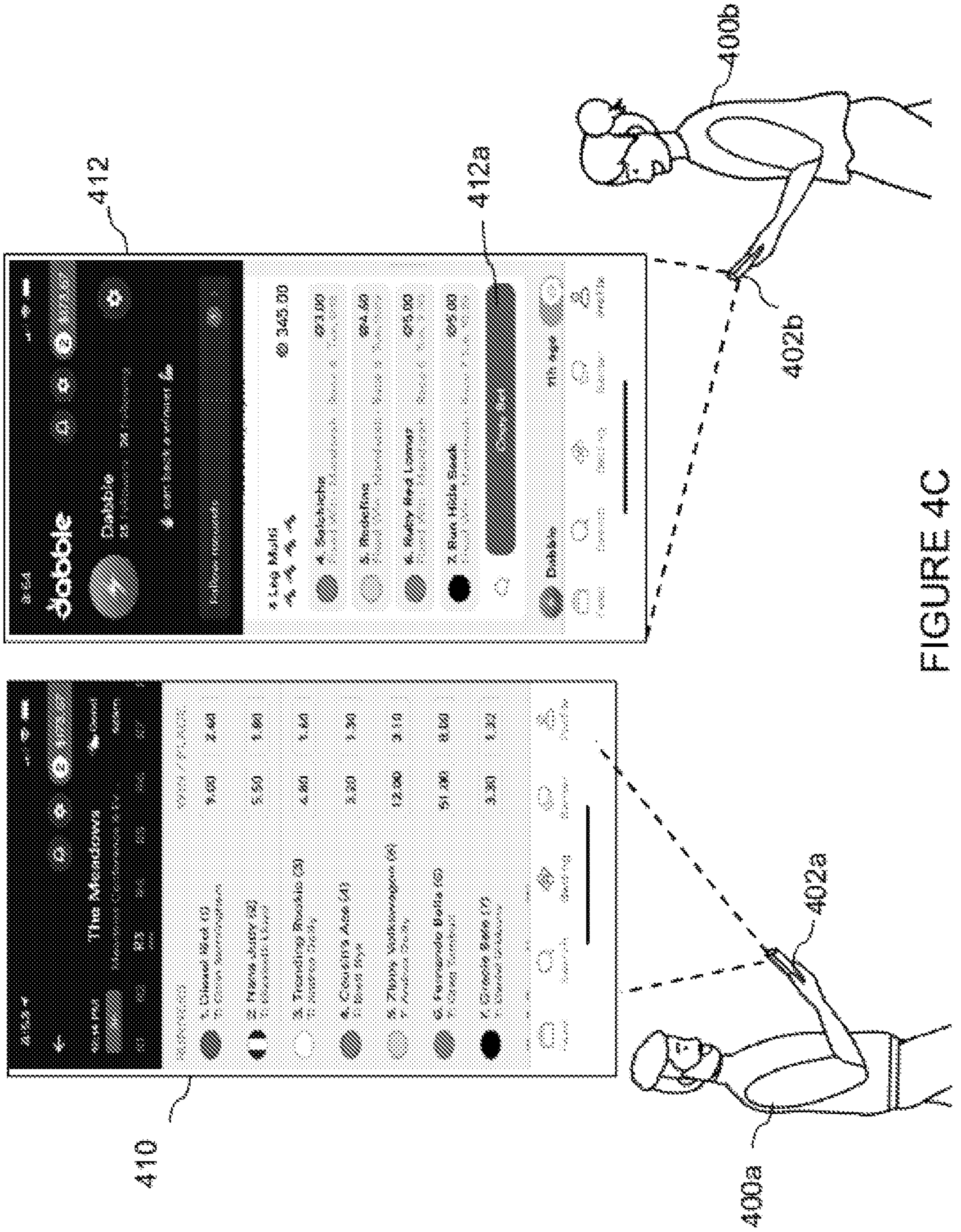
FIGS. 4C and 4D, in combination, illustrate pictorial representation of the transaction phase in the contingency wagering process, in accordance with some embodiments of the present disclosure.
Figure 4D:
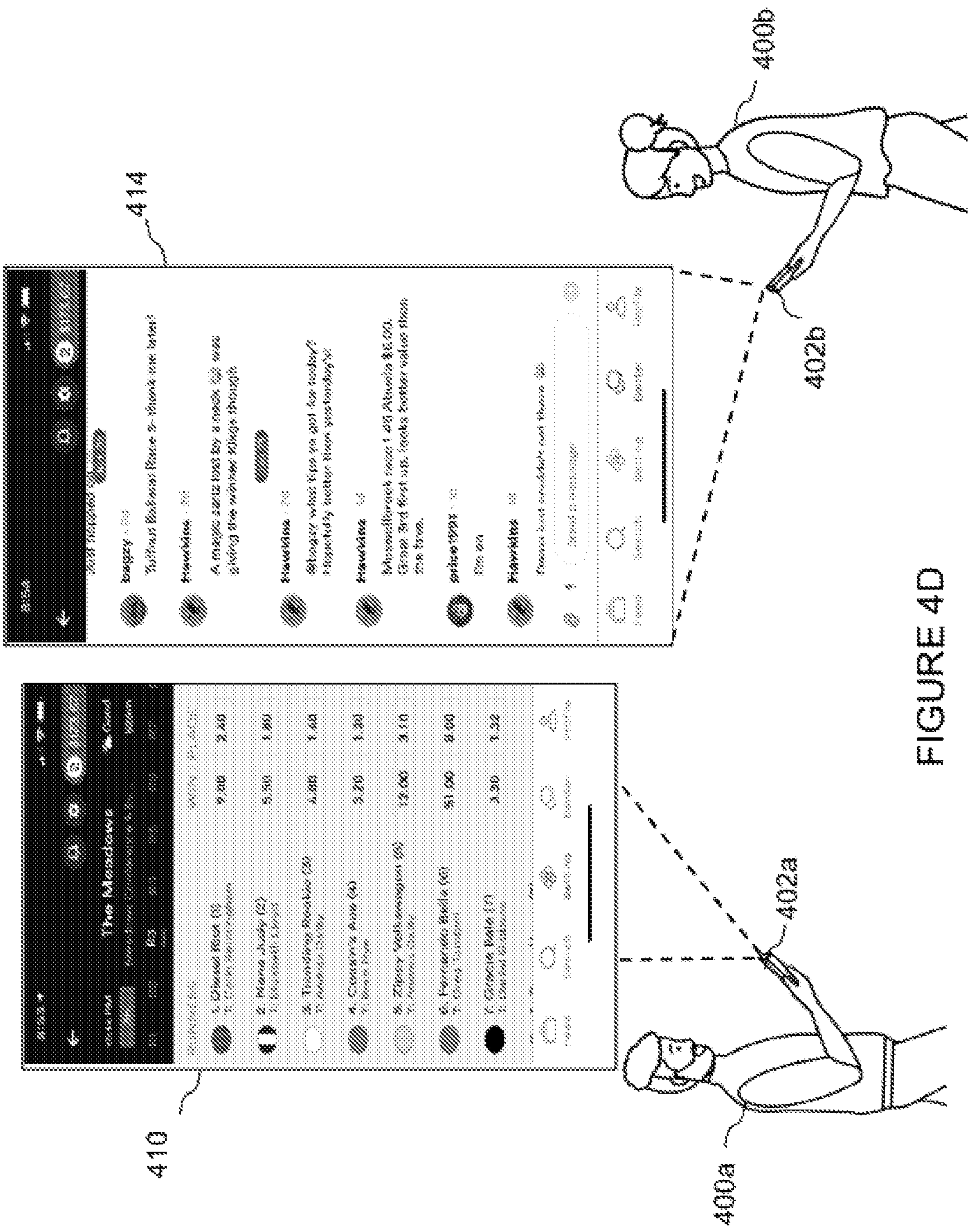

FIGS. 4C and 4D, in combination, illustrate pictorial representation of the transaction phase 300B in the contingency wagering process, in accordance with some embodiments of the present disclosure.

FIG. 4C illustrates a copy operation on a bet in the contingency wagering process. In such a scenario, the first user 400$a$ selects a bet from an application interface 410 being displayed on the user device 402$a$. As the first user 400$a$ selects one or more bets from the application interface 410, a notification is sent to the user account running on the user device 402$b$. Additionally or alternatively, the one or more bets placed by the first user 400$a$ is displayed on the application interface 412 of the user device 402$b$ of the second user 400$b$. The application interface 412 also displays a link 412$a$ to copy one or more bets. For instance, the application interface displays the link 412$a$ as "copy bet" for the bet placed by the first user 400$a$ on the user device 402$a$.

The second user 400$b$ can tap on the link to copy the one or more bets. Subsequently, a notification is sent to the user device 402$a$ of the first user 400$a$ who is the originator of the one or more bets.

FIG. 4D illustrates posting comments and reaction on the bet feed or the profile feed of the first user 400$a$.

In an exemplary scenario, the second user 400$b$ posts comments, for the one or more bets place by the first user 400$a$, from an application interface 414 displayed on the user device 402$b$. Also, the second user 400$b$ can place reactions by using one or more reaction buttons, where the one or more reaction buttons include different emoticons such as "@)", GIFs, pictures, etc. The comments and the reactions are shared with the first user 400$a$ as a notification on the user device 402$a$ of the first user 400$a$.

Figure 5:
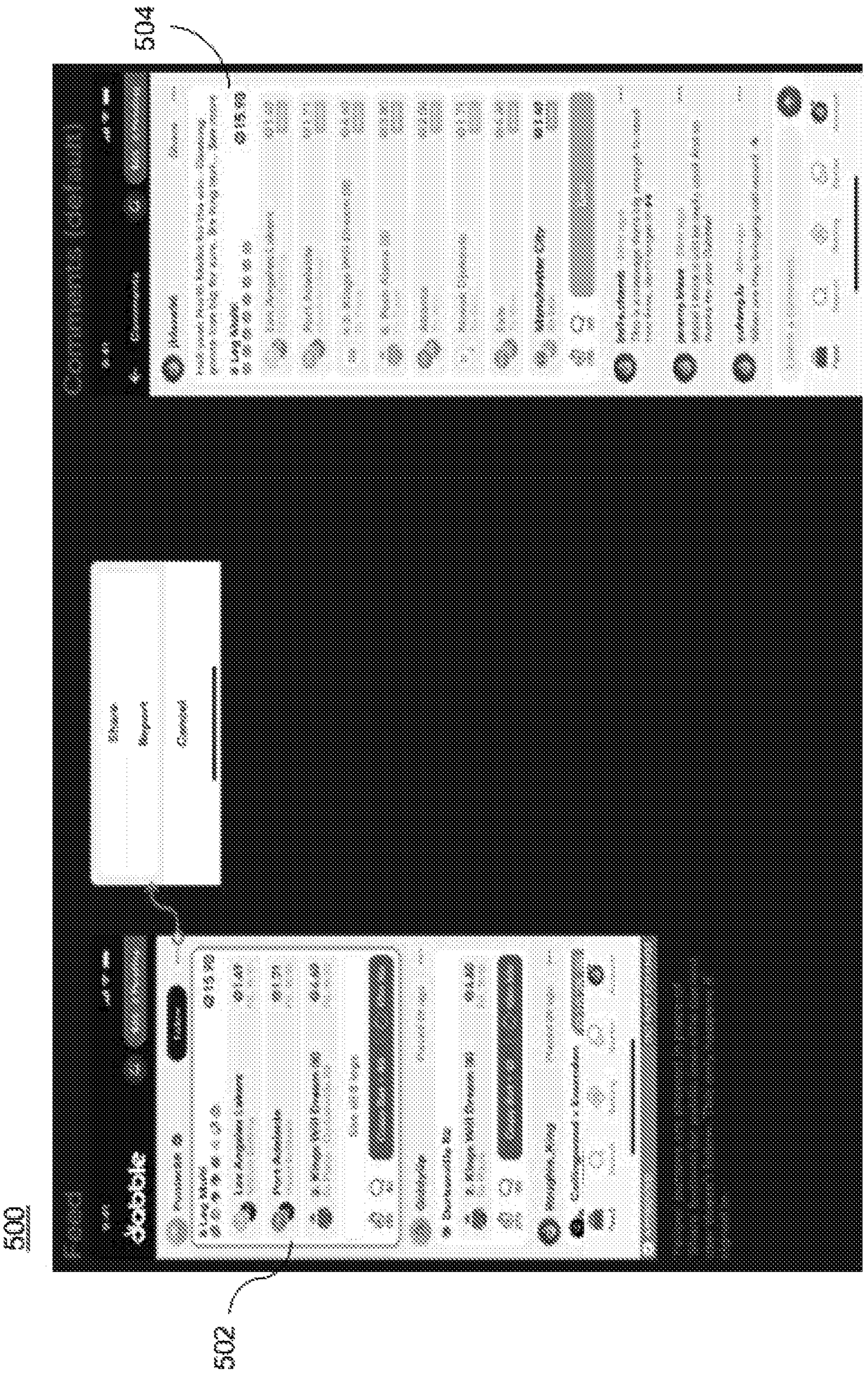
FIG. 5 illustrate bet feed display, in accordance with some embodiments of the present disclosure.

FIG. 5 illustrate bet feed display 500, in accordance with some embodiments of the present disclosure.

In FIG. 5, there is shown an integrated bet feed display 500 of contingency wagering, where multiple windows (such as a window 502 and a window 504) may be concurrently displayed on a single screen. The bet feed display 500 may be displayed on each user device of the plurality of user devices (106$a$-106$n$). In particular, the bet feed display 500 includes a bet feed, a profile feed, one or more comments, an input text area to add comments, a reaction button to add reaction, and reactions on one or more bets within a single display screen. In addition, the bets of profiles of users being followed are displayed on the display of each user account.

The window 502 indicates bet feed of users being followed by a corresponding user account running on a user device of the plurality of user devices 106*a*-106*n*, the bet feed of each user being followed includes a copy link for each bet. The window 504 indicates bet feed of the user account itself. Thus, a user can see bet feed of his/her user account and the bet feeds of the other user account followed by the users, at a same time.

Some embodiments are based on realization that people generally tend to follow actions taken by popular people or expert people. This increases confidence of a person when they copy the same action which was taken by popular or expert people. Accordingly, in some embodiments, bets of popular and/or expert people are displayed on a bet feed of the user account. Also, each bet is displayed with a link (i.e., "copy bet). Accordingly, the displayed bets of the popular or expert profiles can be copied by clicking on the link.

Some embodiments are further based on realization that each user may prefer to see only the bets which are of interest. In particular, the bets are displayed in the bet feed of each user of a corresponding user device based on a relevancy score. To that end, the display module 202*d* may be configured to determine the relevancy score corresponding to each user account of the plurality of user accounts based on a plurality of parameters. The plurality of parameters may include, but are not limited to, past contingency wagers selected from each corresponding user account of the plurality of user accounts, a degree of relationship between each corresponding user account and other users of the plurality of user accounts, quality of comments posted on the at least one contingency wager, a number of followers of each corresponding user, and a plurality of extraordinary elements associated with the at least one contingency wager. The extraordinary elements may correspond to a value of odds for the at least one contingency wager greater than a threshold value, or a number of legs associated with the at least one contingency wager greater than a threshold value. Accordingly, visibility of content of interest between connected users, and of enabling efficiency in betting transactions for betting tips that are shared with connections.

Figure 6A:
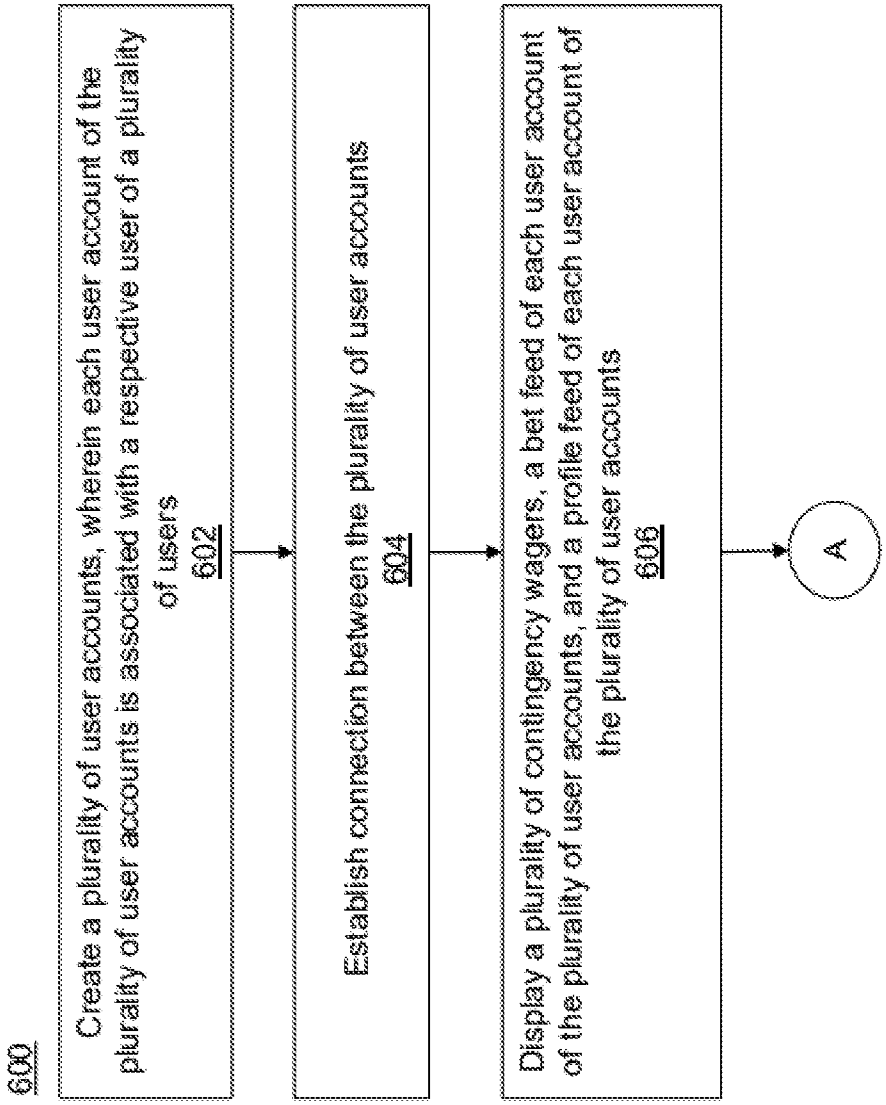
FIGS. 6A-6B is a flowchart diagram illustrating an exemplary method for contingency wagering, in accordance with an embodiment of the present disclosure.
Figure 6B:
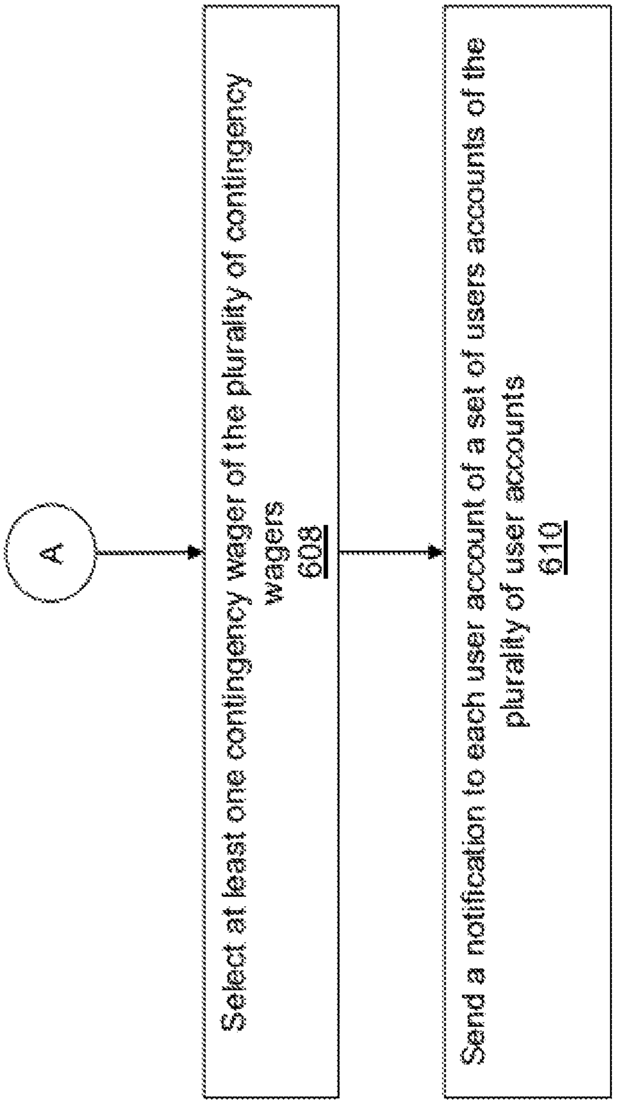

FIGS. 6A-6B is a flowchart diagram 600 illustrating a method for contingency wagering, in accordance with some embodiments of the present disclosure. FIGS. 6A-6B is explained in conjunction with elements from FIGS. 1, 2, 3A, 3B, and 4A-4D. The method illustrated in the exemplary flowchart 600 may be executed by any computing system, such as by the system 102. The method starts at 602 and proceed to 604.

At step 602, a plurality of user accounts may be created. Each user account of the plurality of user accounts is associated with a respective user of a plurality of users (e.g., the plurality of users 108*a*-108*n*). To that end, the social networking module 202 a may provide one or more UIs on a user device of each user of the plurality of users. Further, each user of the plurality of users may provide details such as name, date of birth, email ID, phone number, password, and the like, by using the one or more UIs.

At step 604, connection between the plurality of user accounts may be established. To that end, the plurality of users may send a follow request to each other. In particular, the social networking module 202 may provide a UI to each user device of the plurality of user devices. A user of the plurality of users may send follow request to another user of the plurality of users. When the other user accepts the follow request from his/her user device, the connection is established between the users.

At step 606, a plurality of contingency wagers, a bet feed of each user account of the plurality of user accounts, and a profile feed of each user account of the plurality of user accounts may be displayed. Each user device may be configured to display the contingency wagers, the bet feed, and the profile feed of a corresponding user.

At step 608, at least one contingency wager of the plurality of contingency wagers may be selected. At least one user of the plurality of users may select at least one contingency wager from the plurality of contingency wagers being displayed on the corresponding user device.

At step 610, a notification to each user account of a set of users accounts of the plurality of user accounts may be sent. The notification may be sent to each of a set of user accounts based on selection of the at least one contingency wager by at least one user account of the plurality of user accounts other than the set of user accounts. The notification may include a plurality of links. A first link of the plurality of links may correspond to a copy operation on the at least one contingency wager. The process ends.

Thus, the disclosed contingency wagering system and process provides a central control for executing the contingency wagering and social interaction on a single platform. Also, the disclosed contingency wagering system provides a comprehensive view of each of the bet feed of a user and user accounts of other users followed by the user, which improves visibility of content of interest. Accordingly, the user is not required to switch between multiple platforms to place bet and socially interact with other users. The disclosed contingency system acts as a centralized tool to undertake all these activities. Since a single platform provides these different functionalities, the memory space for storing multiple tools or platforms is saved. Also, the processing for processing data of multiple tools or platforms is also reduced.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of various components. Those of skill in the art are familiar with such details, and unless departures from those techniques are set out, techniques, known, related art or later developed designs and materials should be employed. Those in the art are capable of choosing suitable manufacturing and design details.

It will be understood that the devices and the databases referred to in the previous sections are not necessarily utilized together method or system of the embodiments.

Rather, these devices are merely exemplary of the various devices that may be implemented within a computing device or the server device, and can be implemented in exemplary another device, and other devices as appropriate, that can communicate via a network to the exemplary server device.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. A system for contingency wagering, comprising: a social networking module configured to:

provide a first user interface (UI) to create a plurality of user accounts, wherein each user account of the plurality of user accounts is associated with a respective user of a plurality of users; and provide a second UI to enable each user of the plurality of users to establish connection between the plurality of user accounts;

a display module configured to provide display of:

a plurality of contingency wagers, a bet feed of each user account of the plurality of user accounts, and a profile feed of each user account of the plurality of user accounts;

a contingency wager module configured to enable each user of the plurality of users to select at least one contingency wager of the plurality of contingency wagers provided by the display module; and a notification module configured to send a notification to each user account of a set of users accounts of the plurality of user accounts, wherein the notification is sent to each user account of the set of user accounts based on selection of the at least one contingency wager by at least one user account of the plurality of user accounts other than the set of user accounts, the notification includes a plurality of links, and a first link of the plurality of links corresponds to a copy operation on the at least one contingency wager.

2. The system of claim 1, wherein a second link of the plurality of links corresponds to selection of the profile feed of the at least one user account other than the set of user accounts, and a third link of the plurality of links corresponds to selection of the bet feed of the at least one user account other than the set of user accounts.

3. The system of claim 1, wherein the display module is further configured to provide, on the bet feed of the at least one user other than the set of users, the at least one contingency wager selected by the at least one user other than the set of users.

4. The system of claim 3, wherein the social networking module is further configured to provide, to each user account of the plurality of user accounts, a third UI to add comments on the at least one contingency wager on the bet feed of the at least one user other than the set of users.

5. The system of claim 4, wherein the display module is further configured to:

determine a total number of the comments on the bet feed of the at least one user other than the set of users; and aggregate the comments in the bet feed based on the total number of comments being greater than a threshold value.

6. The system of claim 1, wherein the at least one user account other than the set of user accounts corresponds to an originator of the at least one contingency wager selected from the plurality of contingency wagers.

7. The system of claim 6, wherein the contingency wagering module is further configured to execute the copy operation on the at least one contingency wager based on a user input corresponding to the selection of the first link.

8. The system of claim 7, wherein the contingency wagering module is further configured to execute a paste operation on the at least one contingency wager after the execution of the copy operation, and the execution of the paste operation corresponds to selection of the at least one contingency wager by at least one of the set of user accounts connected to the originator of the at least one contingency wager.

9. The system of claim 8, wherein the notification module is further configured to send a notification to the originator of the contingency wager when the copy operation is executed on the at least one contingency wager.

10. The system of claim 1, wherein the display module is further configured to determine a relevancy score corresponding to each user account of the plurality of user accounts, wherein the relevancy score is determined based on a set of parameters, and the set of parameters includes at least:

past contingency wagers selected from each corresponding user account of the plurality of user accounts, a degree of relationship between each corresponding user account and other users of the plurality of user accounts, quality of comments posted on the at least one contingency wager, a number of followers of each corresponding user, and a plurality of extraordinary elements associated with the at least one contingency wager.

11. The system of claim 10, wherein the plurality of extraordinary elements corresponds to at least one of:

a value of odds for the at least one contingency wager greater than a threshold value, or a number of legs associated with the at least one contingency wager greater than a threshold value.

12. The system of claim 10, wherein the display module is further configured to provide display of the plurality of contingency wagers based on the relevancy score.

13. The system of claim 1, wherein the display module is further configured to concurrently display the bet feed, the profile feed, one or more comments, an input text area to add comments, and a reaction button.

14. The system of claim 1, wherein the contingency wagering module is further configured to receive user one or more user inputs to add a synopsis for the at least one contingency wager.

15. The system of claim 1, wherein the social networking module is further configured to:

provide a search field to search profiles of the plurality of users;

receive a user input to select a desired profile from among search results; and receive a user input to send a follow request to the desired profile.

16. The system of claim 1, wherein each user account of the plurality of user account is one of a public account or a private account.

17. A method for contingency wagering, comprising:

creating a plurality of user accounts, wherein each user account of the plurality of user accounts is associated with a respective user of a plurality of users;

establishing connection between the plurality of user accounts;

displaying each of: a plurality of contingency wagers, a bet feed of each user account of the plurality of user accounts, and a profile feed of each user account of the plurality of user accounts;

selecting at least one contingency wager of the plurality of contingency wagers being displayed; and sending a notification to each user account of a set of users accounts of the plurality of user accounts, wherein the notification is sent to each of the set of user accounts based on selection of the at least one contingency wager by at least one user account of the plurality of user accounts other than the set of user accounts, the notification includes a plurality of links, and a first link of the plurality of links corresponds to a copy operation on the at least one contingency wager.

18. The method of claim 17, wherein a second link of the plurality of links corresponds to selection of the profile feed of the at least one user account other than the set of user accounts, and a third link of the plurality of links corresponds to selection of the bet feed of the at least one user account other than the set of user accounts.

19. The method of claim 17, further comprising concurrently displaying the bet feed, the profile feed, one or more comments, an input text area to add comments, and a reaction button.

20. A first user device for contingency wagering, comprising:

a memory configured to store computer-executable instructions; and a processor communicatively coupled to the memory, wherein the processor is configured to execute the computer-executable instructions to:

control a display screen to:

display a first user interface (UI) to receive a plurality of user inputs to create a user account of a first user; and display a second UI to receive one or more inputs from the first user to establish a connection with a user account of a second user, wherein the user account of the second user operates on a second user device;

select at least one contingency wager of a plurality of contingency wagers based on one or more user inputs from the first user; and sending a notification to the user account of the second user, wherein the notification includes a link to execute a copy operation on the at least one contingency wager selected by the first user.

* * * * *